United States Patent [19]

Zikeli et al.

[11] Patent Number: 5,626,810
[45] Date of Patent: May 6, 1997

[54] PROCESS FOR THE PREPARATION OF CELLULOSE SOLUTIONS

[75] Inventors: Stefan Zikeli, Regau; Peter Hinterholzer, Schörfling, both of Austria

[73] Assignee: Lenzing Aktiengesellschaft, Austria

[21] Appl. No.: 209,439

[22] Filed: Mar. 10, 1994

[30] Foreign Application Priority Data

Oct. 19, 1993 [AT] Austria ................... 2104/93

[51] Int. Cl.$^6$ ................... C08B 1/00; C08J 3/09
[52] U.S. Cl. ................... 264/187; 264/207
[58] Field of Search ................... 264/187, 207, 264/208, 349, 177.11, 211.11; 106/186

[56] References Cited

U.S. PATENT DOCUMENTS

| | | | |
|---|---|---|---|
| 2,035,148 | 3/1936 | de Nooij et al. | |
| 2,179,181 | 11/1939 | Graeacher et al. | |
| 3,447,939 | 6/1969 | Johnson . | |
| 3,447,956 | 6/1969 | Johnson . | |
| 3,508,941 | 4/1970 | Johnson . | |
| 4,144,080 | 3/1979 | McCorsley III | 106/186 |
| 4,246,221 | 1/1981 | McCorsey, III | 264/208 |
| 4,880,469 | 11/1989 | Chanzy et al. | 264/187 |
| 5,094,690 | 3/1992 | Zikeli et al. | |

FOREIGN PATENT DOCUMENTS

| | | |
|---|---|---|
| 914674 | 11/1972 | Canada . |
| 1171615 | 7/1984 | Canada . |
| 2040844 | 4/1991 | Canada . |
| 356419 | 8/1989 | European Pat. Off. . |
| 891434 | 2/1943 | France . |
| 2830685 | 7/1978 | Germany . |
| 226573 | 9/1984 | Germany . |

OTHER PUBLICATIONS

Database WPI, Week 9215, Derwent Publications Ltd., London, GB; AN 121407 & SU,A,1 645 308 (Golova L.K.) 30 Apr. 1991; siehe Zusammenfassung.
English language abstract of EP 0 452 610.
Taeger E. et al., "Untersuchungen zur Auflösung und Verformung von Cellulose in N–Methylmorpholin–N–Oxid", Das Papier, 12, pp. 784–788 (1991).
English language abstract of DE 28 30 685.
English language abstract of DD 226 573.
English language abstract of EP 356 419.

*Primary Examiner*—Mathieu D. Vargot
*Attorney, Agent, or Firm*—Brumbaugh, Graves, Donohue & Raymond

[57] ABSTRACT

A process is disclosed for the preparation of a shapeable solution of cellulose in an aqueous tertiary amine-oxide from comminuted cellulose. The process includes introducing previously comminuted cellulose material into an aqueous solution of a tertiary amine-oxide to prepare an initial suspension, subjecting the initial suspension to high-consistency milling to further break-up the cellulose material to obtain a second suspension, and converting the second suspension into a shapeable solution of cellulose by heating under reduced pressure.

9 Claims, No Drawings

PROCESS FOR THE PREPARATION OF CELLULOSE SOLUTIONS

The current invention concerns a process for the preparation of a shapeable solution of cellulose in an aqueous tertiary amine-oxide.

BACKGROUND OF THE INVENTION

Tertiary amine-oxides are known as alternative solvents for cellulose. From U.S. Pat. No. 2,179,181 is known for example that tertiary amine-oxides possess the property of dissolving cellulose without having to be converted into derivatives and that cellulose mouldings such as fibres can be made from these solutions by precipitation. In U.S. Pat. Nos. 3,447,939, 3,447,956 and 3,508,941 further processes for the preparation of cellulose solutions are described whereby the solvents used are preferably cyclic amine-oxides. In all these processes cellulose is physically dissolved at elevated temperatures.

If the solution is prepared in a twin-screw extruder or in a stirred vessel, the cellulose must be subjected to a preactivation procedure to ensure that the solution process is adequately fast (see "Das Papier", Vol 12, pp 784–788). As a preactivation procedure, the formation and regeneration of alkali-cellulose or a hydrothermal cellulose treatment is proposed.

Also according to DD-A 225 573, the cellulose is preactivated before preparing the solution, which is also carried out in an extruder. In the cited DD-A, the process starts from a cellulose suspension containing NMMO with a low consistency maximum of 2.5 wt % cellulose. This cellulose suspension is homogenised in a stirred vessel. Then by centrifuging or by pressing, the consistency is raised to 12.5 wt %, dried to a water content of 10–15 wt % (based on NMMO) and converted to a clear solution at temperatures between 75° and 120° C. in an extruder with a degassing zone.

The process according to the cited DD-A 226 573 suffers the disadvantage that after homogenisation the consistency must be increased from 2.5 wt % to 12.5 wt % before the actual preparation of the solution can commence. This necessitates a separate additional operating step. Furthermore, during the centrifuging or pressing procedures, not only water but also NMMO is removed which is undesirable.

The process of the Applicant described in EP-A 0 356 419 starts from cellulose, among other materials, which is milled in the dry state. The use of a dry milled cellulose allows it to be stirred into the aqueous NMMO solution in such large amounts that the process step for increasing the consistency becomes superfluous. This starting material, namely the dry milled cellulose, can however contain horny fragments which arise from local overheating during the milling process and these have an adverse effect on the solubility in aqueous NMMO. Dry milling to give fine particles also damages the cellulose structure. In this respect, dry milling to give larger particles would really be better but larger particles must preferably be excluded from the solution because otherwise the cellulose just becomes swollen at the surface and becomes difficult to dissolve, which leads to the formation of gel bodies and makes the cellulose solution difficult to filter.

The invention has as its object to simplify and improve the preparation of solutions of cellulose in tertiary amine-oxides.

SUMMARY OF THE INVENTION

The process according to the invention for the preparation of a shapeable solution of cellulose in an aqueous tertiary amine-oxide is characterised by the combination of the following measures:
a) previously comminuted cellulose materials are introduced into an aqueous solution of a tertiary amine-oxide in order to prepare an initial suspension having a consistency of at least 10 wt % cellulose;
b) the initial suspension is subjected to high-consistency milling whereby a second suspension is obtained, and
c) the second suspension is converted into the shapeable solution of cellulose by heating under reduced pressure.

DETAILED DESCRIPTION OF THE INVENTION

It has been shown that wet milling in the high-consistency region in the presence of a tertiary amine-oxide breaks-up or activates the cellulose material so well that preparation of the solution is facilitated. Conventional high-consistency mixers, dispersers and refiners are suitable for use as milling equipment.

Wet milling of cellulose in the high-consistency region is known per se from CA-PS 914 674. This functions to give improved break-up of the cellulose for the subsequent chemical reaction, in which the cellulose is converted into cellulose acetate.

The fibres are cut, fibrillated and swollen during wet milling. By the term fibrillation is meant the splitting of the fibres parallel to the fibre axis. After the milling process, the larger part of the fibrils remain attached like frills to the fibres. Machines such as for instance, Hollander beaters, Jordan mills, refiners, disc mills, high shear mixers and pulpers can be used for milling. The stock slurry is processed between a moving part and a fixed part of the machine during the milling process.

High-consistency milling is the milling of an aqueous suspension which contains between about 10 wt % and 35 wt % of the dry substance (cellulose). In high-consistency milling, the milling energy is better transmitted to the cellulose than in conventional milling. In such a process there occurs not only splitting of the cellulose into individual fibres but also fibrillation and breaking of the individual fibres.

The process according to the invention is also characterised in that the desired effect occurs even when the aqueous solution used to prepare the initial suspension only contains between 60 and 72 wt % tertiary amine-oxide, and thus contains a relatively high water content. This allows in a simple way, for example, used spinning baths or coagulation baths respectively to be reused as the solvent after regeneration. It has been shown that the desired effect also occurs when additives are present in the initial and/or the second suspension, such as for example, $TiO_2$, kaolin, dyestuffs, graphite, $BASO_4$, carboxymethyl cellulose and flame retardants.

To dissolve the cellulose in step (c), the water content has merely to be adjusted to below 17 wt %. This can be done so that excess water is initially removed in a first step and the resulting material is then melted in an extruder to give a solution. These process steps are known for example from DE-A 2 830 685. Both these processes are expediently united into a single process in which the second suspension obtained in step (b) is converted directly into the solution according to the process described in EP-A 0 356 419.

It has been shown that in the process according to the invention, the previously-comminuted cellulose material which is used can be processed without problems, even with a particle size of 70 mm, to give the second suspension. The use of cellulose chippings as the previously-comminuted material, with a size up to 20 mm, is particularly advantageous. These chippings can be obtained for example in a hammer mill or in a cutting mill.

Another advantage of the process according to the invention is that not only high-grade cellulose can be used as the cellulose material but for example waste paper, old cardboard or paper mouldings can also be used at least in part.

It is even possible to use wood chippings and/or wood shavings in part as the cellulose material and to process them. It is known that wood fibres which normally have thick cell walls, and fibres with a high lignin content or a high resin content, reduce the reactivity of the cellulose. The high-consistency milling process provided according to the invention and in the presence of a tertiary amine-oxide activates these cellulose materials to such an extent however, that a homogeneous solution having good filtration properties is obtained in step (c).

N-methylmorpholine-N-oxide has proved to be especially good as the tertiary amine-oxide in the process according to the invention.

The invention also concerns a process for the preparation of cellulose mouldings, in which process the cellulose solution prepared according to the invention is shaped and is introduced into a precipitation bath. Films, tubular films, spun fibres and sponges are examples to be regarded as mouldings.

A preferred embodiment of the invention is described in more detail in the following Examples.

General Operating Procedure

The previously-comminuted cellulose was impregnated in a mixer with such an amount of 72 wt % NMMO (28 wt % water) that an 11–16% suspension was obtained. The suspension was then heated to a temperature between 50° and 65 ° C.

The cellulose previously impregnated with NMMO in this way was continuously removed from the mixer by an eccentric pump and was transferred by a conveying screw into a refiner. After passing over the milling or dispersion plates of the refiner, the product was removed through a discharge pipe and transferred by an eccentric screw pump into a buffer vessel (for example, a mixer) from which it was taken when the solution was to be prepared. The solution was prepared according to the process described in EP-A 0 356 419.

EXAMPLES 1–4

A Krima-Disperger KD 450 was used for milling (disc diameter 450 mm; rotor revolutions 1500 rpm). The starting material was a previously-hydrolysed sulphate cellulose of the type Buckeye V5 (manufacturer: Proctor & Gamble) which had been previously comminuted with a cutting granulator to a size of 4 mm and had been mixed with 70% NMMO. The results are given in Table 1:

TABLE 1

| Example No. | Consistency (wt %) | Throughput (kg/h) | Mill gap (mm) |
| --- | --- | --- | --- |
| 1 | 11.40 | 272 | 0.05 |
| 2 | 11.38 | 272 | 0.10 |
| 3 | 11.83 | 272 | 0.20 |
| 4 | 11.68 | 272 | 0.30 |
| Comparison | 11.49 | — | — |

The suspensions obtained from Examples 1–4 could be converted into a solution in a shorter time than could the unmilled comparative suspension (comparison), in which occasional gel bodies could also be seen.

As already mentioned, the comparative example was carried out using a cellulose which had not been milled and had therefore only been subjected to the comminution process before impregnation with amine-oxide. In the preparation of the solution in accordance with the NMMO process (independent of whether the solution was prepared in a stirred vessel, in an extruder or in a Filmtruder), the cellulose particles became surrounded by highly-viscous, newly-formed cellulose solution during the evaporation of water and this formed a constraint to further exchange of material. This is assumed to be the cause for the formation of gel bodies and for the incomplete formation of the highly viscous solution. These gel bodies lead to filtration problems.

EXAMPLES 5 AND 6

An Andritz Sprout-Bauer refiner was used (disc diameter 300 mm; rotor revolutions 3000 rpm). The starting material was a previously-hydrolysed sulphate cellulose of the type Buckeye V5 (manufacturer: Proctor & Gamble), previously comminuted to give a maximum particle size of 70 mm and admixed with 70% NMMO. The results are given in Table 2:

TABLE 2

| Example No. | Consistency (wt %) | Throughput (kg/h) | Mill gap (mm) |
| --- | --- | --- | --- |
| 5 | 14.5 | 150 | 0.20 |
| 6 | 14.5 | 150 | 0.30 |
| Comparison | 15.9 | — | — |

Since the cellulose particles had a maximum size of 70×70 mm, a longer time was necessary to prepare the solution than was required in Examples 1–4. Here too the phenomenon was observed, that the suspensions obtained in Examples 5 and 6 could be converted into solutions in a shorter time than was necessary for the unmilled comparative suspension, in which gel bodies could also be seen.

We claim:

1. Process for the preparation of a shapeable solution of cellulose in an aqueous tertiary amine-oxide, comprising the steps of:
    (a) introducing previously comminuted cellulose material into an aqueous solution of a tertiary amine-oxide to prepare an initial suspension with a consistency of at least 10 wt % cellulose,
    (b) subjecting the initial suspension to high-consistency milling whereby a second suspension is obtained, and
    (c) converting the second suspension into the shapeable solution of cellulose by heating under reduced pressure.

2. Process in accordance with claim 1, wherein, the aqueous solution used to prepare the initial suspension contains between 60 and 72 wt % of the tertiary amine-oxide.

3. Process in accordance with claim 2, wherein, the previously comminuted cellulose material has a maximum particle size of 70 mm.

4. Process of claim 1, 2 or 3, wherein waste paper which has been comminuted is at least partly used as the cellulose material.

5. Process of claim 1, 2 or 3, wherein wood chippings and/or wood shavings are at least partly used as the cellulose material.

6. Process of claim 1, 2, or 3, wherein step (c) cited in claim 1 is carried out in a thin film treatment apparatus for high viscosity materials.

7. Process of claim 1, 2 or 3, wherein N-methylmorpholine-N-oxide is used as the tertiary amine-oxide.

8. Process in accordance with claim 1, wherein, additives are added to the initial suspension and/or to the second suspension.

9. Process in accordance with claim 1, 2 or 3, further comprising shaping the cellulose solution and introducing it into a precipitation bath.

* * * * *